Patented May 15, 1923.

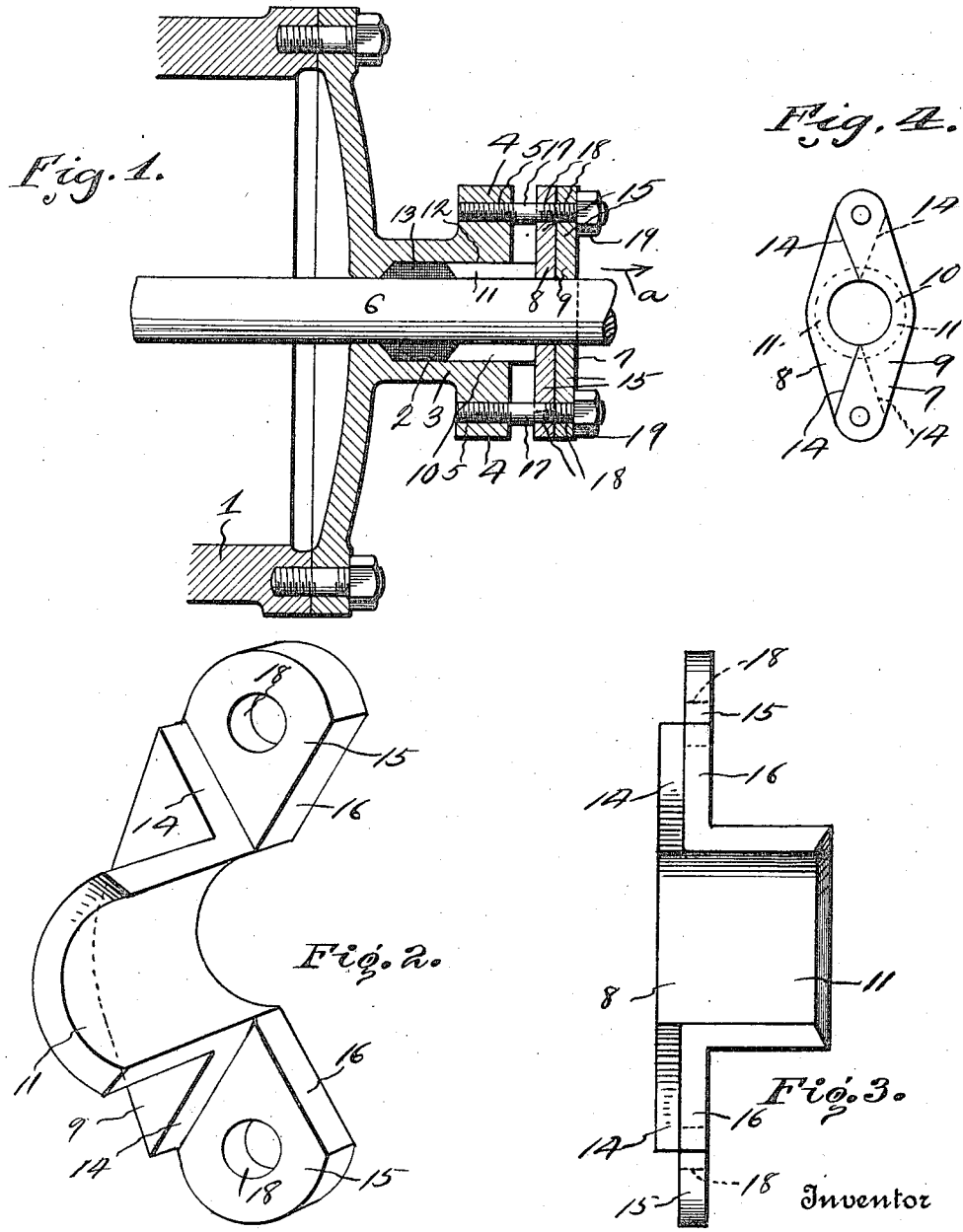

1,455,606

UNITED STATES PATENT OFFICE.

MAURO DI LORENZO, OF LANDISBURG, WEST VIRGINIA.

STUFFING-BOX GLAND.

Application filed December 16, 1919. Serial No. 345,226.

*To all whom it may concern:*

Be it known that I, MAURO DI LORENZO, a citizen of the United States, residing at Landisburg, in the county of Fayette, State of West Virginia, have invented a new and useful Stuffing-Box Gland; and I do hereby declare the following to be a full, clear, and exact description of the invention, such as will enable others skilled in the art to which it appertains to make and use the same.

The invention relates to stuffing box glands and has for its object to provide a gland formed in two sections, thereby allowing the removal of the gland from around the piston rod without removing the piston rod from the piston and the cylinder.

A further object is to provide a gland for a stuffing box formed in two parts, the sleeve of said gland being severed at diametrically opposite points so that it will receive a piston rod and the flange of said gland being provided with overlapping portions having registering apertures therein, through which registering apertures bolts pass for maintaining the sections of the gland together.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a sectional view through a portion of the cylinder and the stuffing box thereof.

Figure 2 is a perspective view of one section of the sectional gland.

Figure 3 is an inside view of the other section of the sectional gland.

Figure 4 is a front view of the sectional gland.

Referring to the drawings, the numeral 1 designates a cylinder and 2 a conventional form of stuffing box. The casing 3 of the stuffing box is provided with oppositely disposed lugs 4 having threaded apertures 5 therein. Slidably mounted in the stuffing box 2 is a piston 6 of a conventional form. Telescopically engaging the piston 6 is a gland 7; gland 7 is formed in two sections 8 and 9 and the sleeve 10 of said gland 7 is formed from two semi-circular members 11, one of said members being carried by each of the sections 8 and 9 of the gland and when brought together form a sleeve adapted to be forced into the bore 12 of the casing 3 of the cylinder and against packing 13 within said bore 12. Sections 8 and 9 are cutaway as at 14 so as to form overlapping lugs 15 when the sections are brought together. The cutting away forming shoulders against which the angled edges 16 of the lugs 15 engage when the sections are brought together around a piston rod. Threaded in the threaded apertures 5 are stud bolts 17, said stud bolts passing through registering apertures 18 in the overlapping lugs 15 of the sections 8 and 9, there being nuts 19 threaded on the ends of the studs 17 by means of which nuts the sleeve of the gland may be forced into the bore 12 of the casing 3.

It will be seen that when it is desired to remove the gland 7 from the bore 12 of the casing 3 and from the piston 6, it will only be necessary to remove the nuts 19, slide the gland as a whole in the direction of the arrow *a* Figure 1, and when the sleeve formed by the sections 11 has been moved out of the bore 12 the sections 8 and 9 of the gland may be removed from the piston 6.

From the above it will be seen that a stuffing box gland is provided which is formed in two sections thereby allowing the easy removal of the gland for renewing the packing 13 within the stuffing box.

The invention having been set forth what is claimed as new and useful is:—

The combination with a stuffing box having a reciprocating piston rod therein, of a bushing for said stuffing box formed in two sections, said sections being formed from segmentally shaped sleeve sections having flanges, said flanges at their ends being oppositely cutaway in relation to the flanges of the other section, thereby forming a complete flange of uniform thickness when the sections are brought together, the engaging edges of the semi circular sleeve sections and the flanges extending radially in relation to lines at diametrically opposite locations on the inner side of the sleeve and the engaging edges of the flanges of the sections being acutely disposed in relation to each other and diverging from said lines.

In testimony whereof I have signed my name to this specification in the presence of two subscribing witnesses.

MAURO DI LORENZO.

Witnesses:
C. N. PROCTOR,
A. P. ROGERS.